United States Patent
Jeong et al.

(10) Patent No.: US 8,307,070 B2
(45) Date of Patent: Nov. 6, 2012

(54) RESOURCE ALLOCATION METHOD IN WIRELESS NETWORK

(75) Inventors: Wun Cheol Jeong, Daejeon (KR); Jong Moon Chung, Seoul (KR); Ki Yong Jin, Seoul (KR); Seong Soon Joo, Daejeon (KR); Jong Suk Chae, Seoul (KR)

(73) Assignees: Electronics and Telecommunicatios Research Institute, Daejeon (KR); Industry-Academic Cooperation Foundation, Yonsei University, Seoul (KR)

( * ) Notice: Subject to any disclaimer, the term of this patent is extended or adjusted under 35 U.S.C. 154(b) by 230 days.

(21) Appl. No.: 12/621,045

(22) Filed: Nov. 18, 2009

(65) Prior Publication Data

US 2010/0131644 A1    May 27, 2010

(30) Foreign Application Priority Data

Nov. 21, 2008    (KR) .................. 10-2008-0116378

(51) Int. Cl.
    *G06F 15/173* (2006.01)
(52) U.S. Cl. ......... 709/224; 709/226; 709/229; 718/104
(58) Field of Classification Search .................. 709/226, 709/229, 223–224; 718/102, 104
    See application file for complete search history.

(56) References Cited

U.S. PATENT DOCUMENTS

| | | | |
|---|---|---|---|
| 6,844,814 B2 * | 1/2005 | Chin et al. ............... | 340/539.22 |
| 6,907,257 B1 * | 6/2005 | Mizutani et al. ............ | 455/464 |
| 7,171,476 B2 * | 1/2007 | Maeda et al. .................. | 709/227 |
| 7,228,351 B2 * | 6/2007 | Arwe ............................ | 709/226 |
| 7,388,886 B2 * | 6/2008 | Perkins et al. ................ | 370/507 |

(Continued)

FOREIGN PATENT DOCUMENTS

KR    10-2007-0087097    8/2007

(Continued)

OTHER PUBLICATIONS

Zahariev et al, "A method for reducing the energy dissipation in wireless sensor networks using edge node", MIPRO, 2010 Proceedings of the 33rd International Convention Publication Year: 2010, pp. 453-456.*

*Primary Examiner* — Oanh Duong
(74) *Attorney, Agent, or Firm* — Staas & Halsey LLP

(57) ABSTRACT

Provided is a resource allocation method performed in a wireless network formed of a plurality of nodes, the resource allocation method including the operations of forming clusters and electing cluster heads respectively for the clusters; determining whether a node from among the plurality of nodes forming the wireless network is an edge node; if the node is not the edge node according to a result of the determining, collecting link information related to other nodes in a cluster that comprises the node, and delivering the link information to a cluster head of the cluster; and if the node is the edge node according to a result of the determining, otherwise, obtaining link information and scheduling information from an edge node of another cluster within a communication range with the cluster comprising the edge node, and delivering the link information and scheduling information to the cluster head. The resource allocation method decentralizes a load of calculations to several nodes, wherein the load may be centralized to one node in a large ad-hoc network, so that an energy efficiency of the node may be increased, and since the several nodes sequentially perform simple calculation, a total of the resource allocation time may be reduced.

6 Claims, 6 Drawing Sheets

U.S. PATENT DOCUMENTS

| | | | |
|---|---|---|---|
| 7,428,229 B2 * | 9/2008 | Bonta et al. | 370/338 |
| 7,460,549 B1 * | 12/2008 | Cardei et al. | 370/408 |
| 7,627,542 B2 * | 12/2009 | Tantrum et al. | 706/20 |
| 7,697,458 B2 | 4/2010 | Park et al. | 370/254 |
| 8,046,759 B2 * | 10/2011 | de Rose et al. | 718/101 |
| 2002/0169846 A1 * | 11/2002 | Chen et al. | 709/209 |
| 2006/0187866 A1 * | 8/2006 | Werb et al. | 370/311 |
| 2007/0233835 A1 * | 10/2007 | Kushalnagar et al. | 709/223 |
| 2008/0253327 A1 * | 10/2008 | Kohvakka et al. | 370/330 |
| 2010/0268825 A1 * | 10/2010 | Jeong et al. | 709/226 |

FOREIGN PATENT DOCUMENTS

| | | |
|---|---|---|
| KR | 10-2007-0120994 | 12/2007 |
| KR | 10-0810661 | 2/2008 |

* cited by examiner

RESOURCE ALLOCATION METHOD IN WIRELESS NETWORK

CROSS-REFERENCE TO RELATED PATENT APPLICATION

This application claims the benefit of Korean Patent Application No. 10-2008-0116378, filed on Nov. 21, 2008, in the Korean Intellectual Property Office, the disclosure of which is incorporated herein in its entirety by reference.

BACKGROUND OF THE INVENTION

1. Field of the Invention

The present invention relates to resource allocation between cluster heads in a wireless network environment, and more particularly, to a method of eliminating collision between clusters by dividing a whole network into a plurality of clusters and then allowing each of the clusters to separately perform resource allocation.

2. Description of the Related Art

In a wireless ad-hoc network, each of a plurality of mobile nodes independently performs communication in a multi-hop manner by sharing a medium according to a peer-to-peer service. Since many nodes share the medium in such a wireless ad-hoc network, if each node is not controlled in terms of accessing the medium, collision occurs between the nodes. In particular, if a node has a limit in terms of a consumable energy source, an energy loss caused by the collision consumes a large portion of the consumable energy source. In order to control the collision, it is necessary to allocate a time slot to the node by using link information between neighboring nodes.

However, in the wireless ad-hoc network, a certain node only recognizes its neighboring nodes, and thus, it is necessary for one node to collect all of the pieces of link information in the wireless ad-hoc network so as to allocate a resource to the certain node without collision. The one node allocates resources to the nodes by using all the pieces of link information, and broadcasts a result of the allocation to the wireless ad-hoc network, so that the nodes can communicate without collision.

Since the one node has all the pieces of link information, the aforementioned resource allocation method can consider every possible collision in the wireless ad-hoc network. However, as the scale of the wireless ad-hoc network increases, the amount of calculations to be performed by the one node conducting an algorithm sharply increases. Considering that one of the most important issues in the wireless ad-hoc network is a low power issue, the increase of the calculation amount may be a demerit. Also, in general, it is assumed that the nodes are dynamically mobile in the wireless ad-hoc network, meaning that any node from among the nodes may leave the wireless ad-hoc network, and an arbitrary new node may enter the wireless ad-hoc network anytime. In this case, since link information between the nodes is changed, it is necessary to renew resource allocation for communication without collision. Thus, the resource allocation renewal with respect to an increase of node mobility is a serious demerit in the wireless ad-hoc network.

Although a centralized resource allocation algorithm according to the prior art works without a problem, there may be a situation in which not every neighboring node can be actually treated as one network. For example, although a service provider establishes its network and allocates resources to nodes so as to avoid collision between the nodes in the network, if another service provider establishes another network adjacent to the network, the network and the other network cannot be regarded as one network such that collision between the network and the other network may not be controlled.

SUMMARY OF THE INVENTION

The present invention provides a resource allocation method that involves performing resource allocation in a distributed manner, whereby the resource allocation method is appropriate for a scalable ad-hoc network formed of nodes having a limit in terms of energy resources and calculation performance.

According to an aspect of the present invention, there is provided a resource allocation method performed in a wireless network formed of a plurality of nodes, the resource allocation method including the operations of forming clusters and electing cluster heads respectively for the clusters; determining whether a node from among the plurality of nodes forming the wireless network is an edge node; if the node is not the edge node according to a result of the determining, collecting link information related to other nodes in a cluster that comprises the node and delivering the link information to a cluster head of the cluster; and if the node is the edge node according to a result of the determining, otherwise, obtaining link information and scheduling information from an edge node of another cluster within a communication range with the cluster comprising the edge node, and delivering the link information and scheduling information to the cluster head.

According to another aspect of the present invention, there is provided a resource allocation method performed in a wireless network, the resource allocation method including the operations of dividing the wireless network into a plurality of clusters; determining a resource allocation order for the plurality of clusters; and sequentially allocating resources to nodes of each of the plurality of clusters, wherein the allocating is performed by a cluster head of each of the plurality of clusters according to the resource allocation order.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
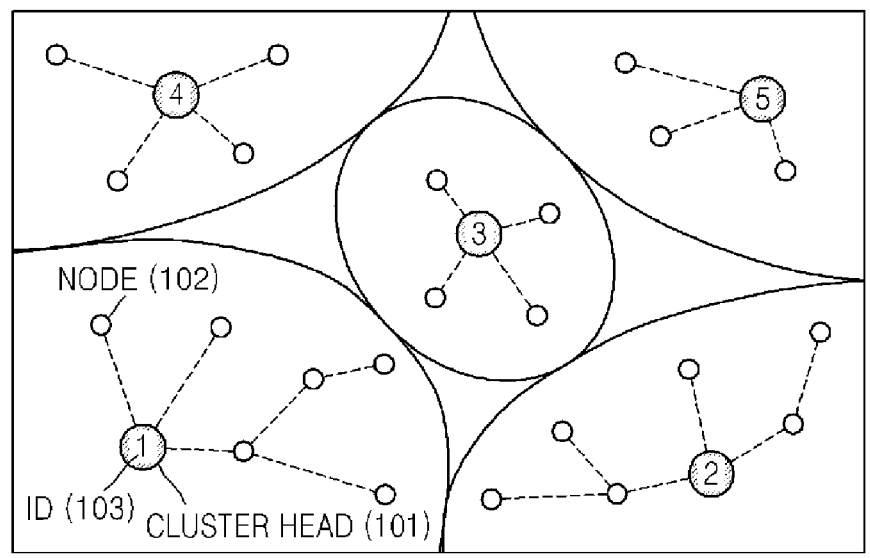
FIG. 1 is a diagram for describing clustering of a network.
Figure 2:
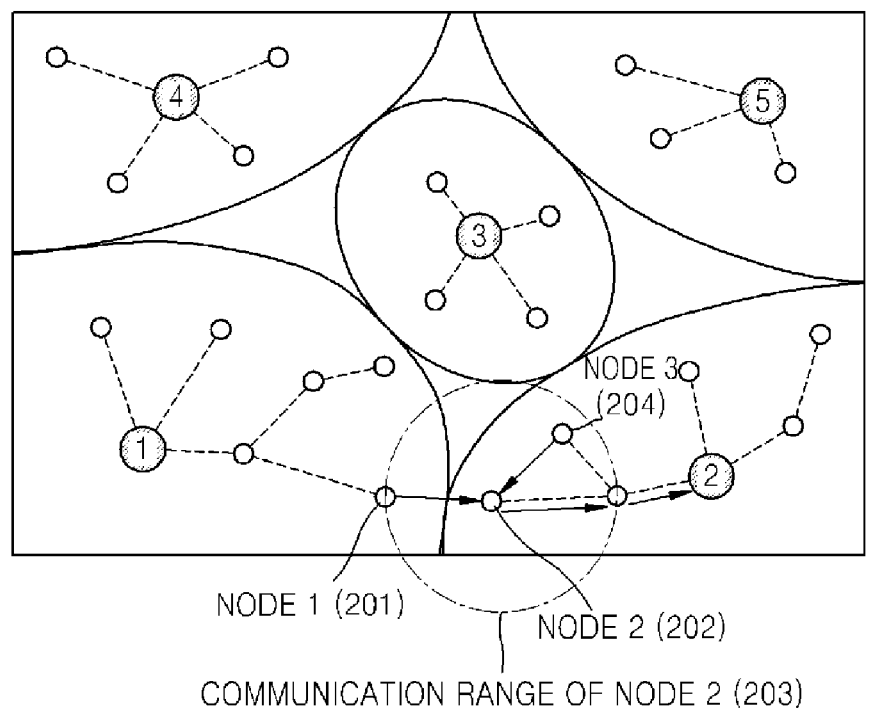
FIG. 2 is a diagram for describing a link information delivering process.
Figure 4:
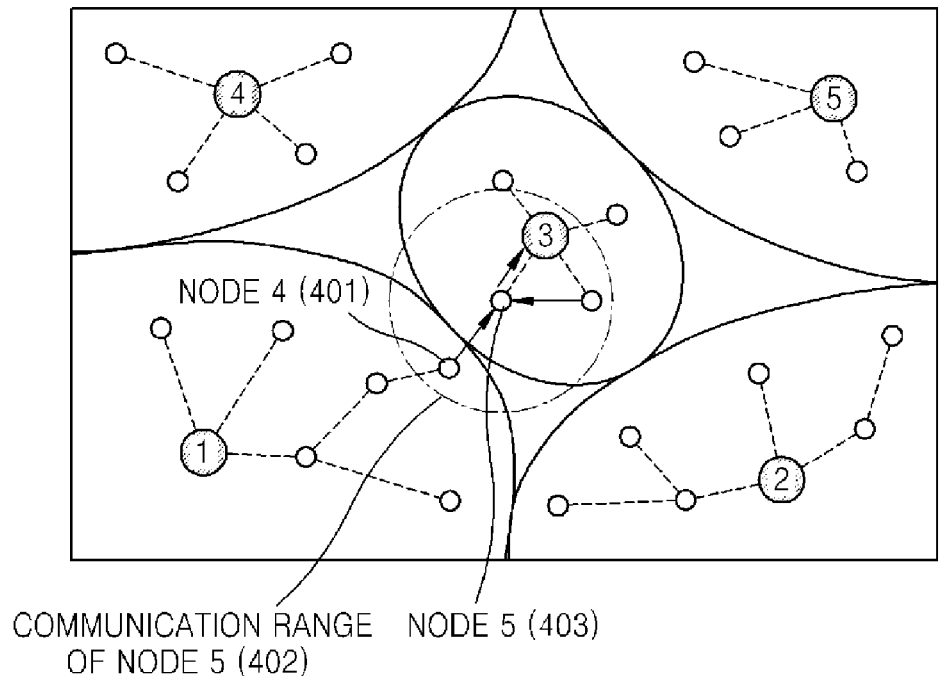
FIG. 4 is another diagram for describing a link information delivering process.
Figure 5:
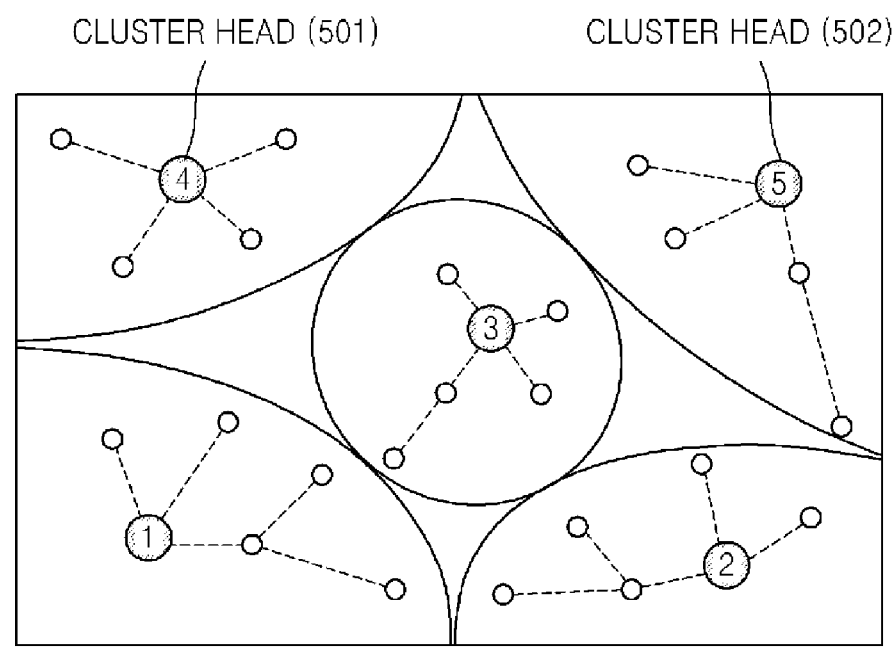
FIG. 5 is a diagram for describing clustering to resolve frame synchronization.
Figure 6:
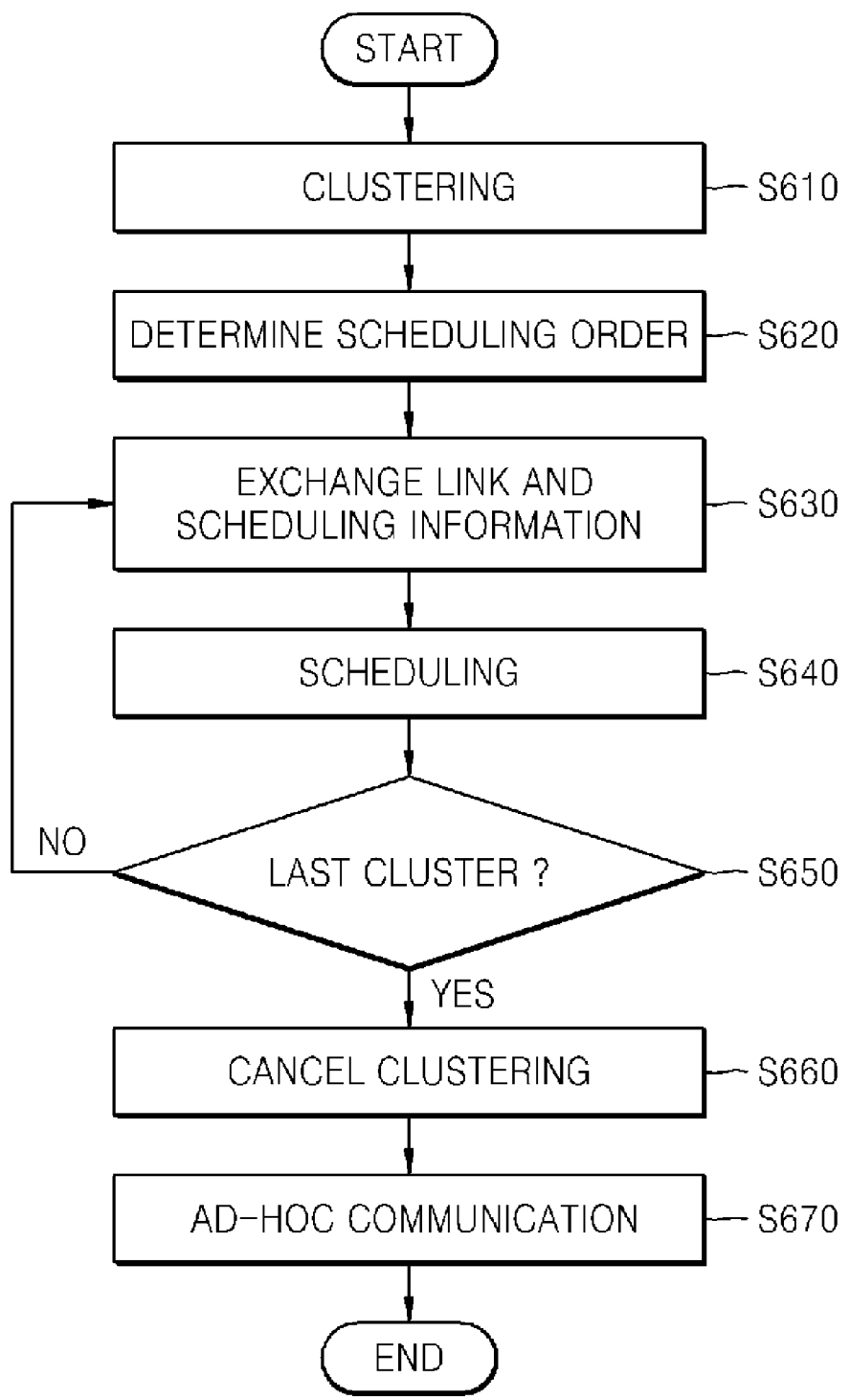
FIG. 6 is a flowchart of an order of operations with respect to a network.
Figure 7:
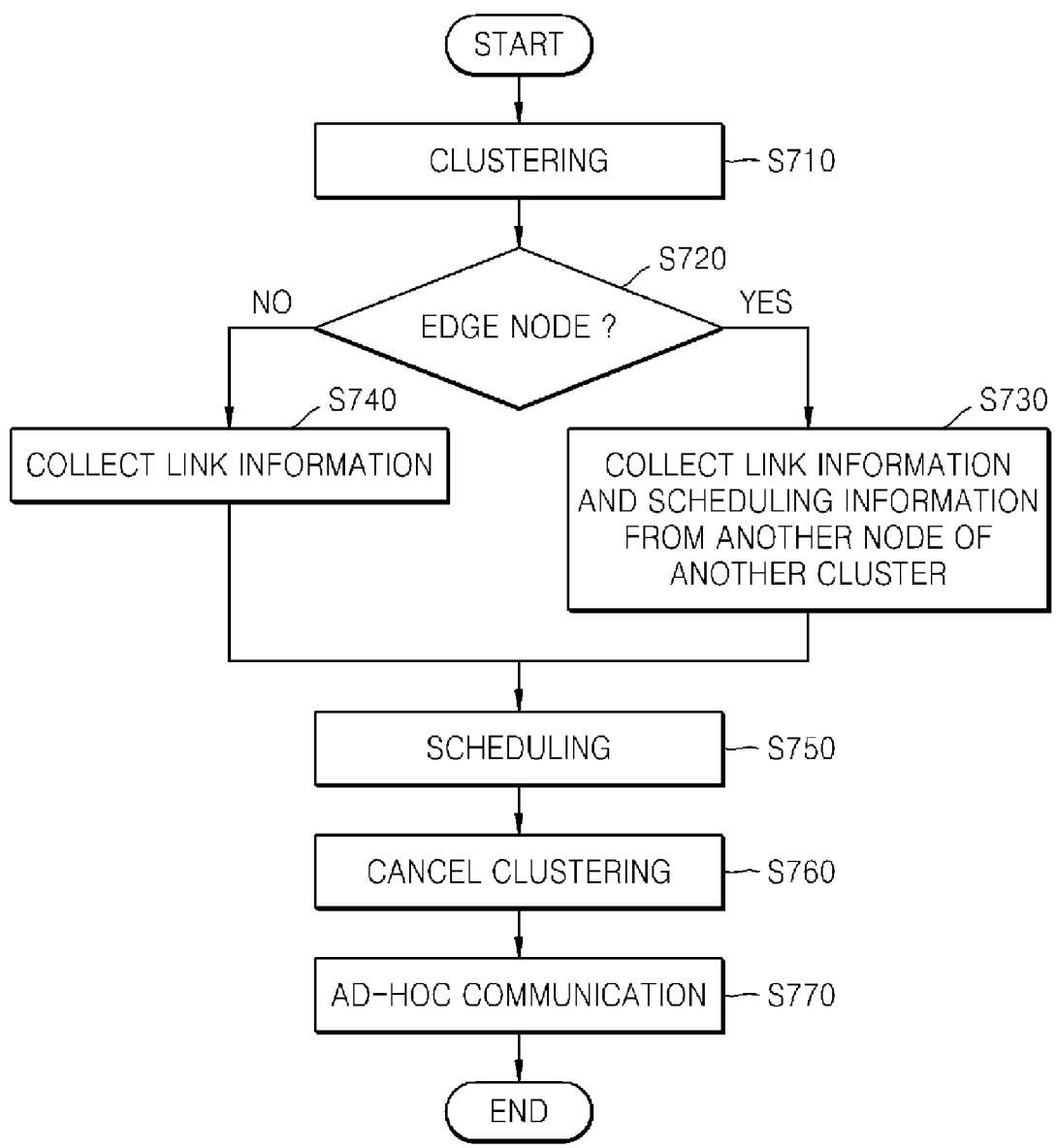
FIG. 7 is a flowchart of an order of operations with respect to each node.

FIG. 1 is a diagram for describing clustering of a network; FIG. 2 is a diagram for describing a link information delivering process; FIG. 3 is a diagram for describing definitions of link information and scheduling information; FIG. 4 is another diagram for describing a link information delivering process; FIG. 5 is a diagram for describing clustering to resolve frame synchronization; FIG. 6 is a flowchart of an order of operations with respect to a network; and FIG. 7 is a flowchart of an order of operations with respect to each node.

A resource allocation method performed preferably in a wireless network, according to an embodiment of the present invention, may divide a whole network into a plurality of small clusters, may set a resource allocation order by using identifications (IDs) of the clusters, may sequentially allocate resources to each of the clusters, and thus may rapidly perform resource allocation without collision in the network.

Referring to FIG. 1, a plurality of nodes 102 forming an ad-hoc network are deployed and then grouped into a cluster through an initial process. After that, the nodes 102 elect a cluster head 101 capable of controlling the cluster. The cluster head 101 communicates with cluster heads of other clusters formed around the cluster, and thus, sets a resource allocation order by using its ID 103. For example, referring to FIG. 1, the resource allocation order may be set in a manner of 1→2→3→4→5, according to an order of IDs of the cluster heads.

First, nodes included in an ad-hoc network are initially deployed to group clusters. Then, cluster heads (CH) are selected to control the clusters, respectively, and ID information is allocated to the cluster heads so as to identify each of the clusters. At this time, preferably the cluster head in each cluster may be the node having the largest number of link nodes.

According to a current embodiment, when the ID information is given to each of the cluster heads, ID value may be sequentially allocated to the cluster head having a largest link value according to the number of nodes linked to each cluster head.

A resource allocation order is determined via collection and exchange of information between each of the selected cluster heads, and each cluster performs resource allocation by using a Broadcast scheduling algorithm (BSA). According to the current embodiment, the resource allocation may be sequentially performed in an order of IDs. According to a distributed resource allocation algorithm, each cluster performs scheduling by using the BSA.

A type of the BSA may be various, for example, the type includes a Mean Field Annealing (MFA) algorithm, a Hopfield Neural Network and Genetic Algorithm (HNN-GA), a Fuzzy Logic and Hopfield Neural Network (FHNN).

After that, each of the cluster heads collects link information from nodes included in its cluster, and performs resource allocation. First, a cluster 1 performs the resource allocation, and in this regard, since the cluster 1 first performs the resource allocation, the resource allocation performed by the cluster 1 is the same as a centralized resource allocation procedure according to the prior art. Here, the centralized resource allocation procedure is well known technology to one of ordinary skill in the art, and thus, a detailed description thereof is omitted here. However, when the resource allocation order is at a cluster 2, the cluster 2 undergoes a different procedure for collecting the link information, as will now be described with reference to FIGS. 2 and 3.

FIG. 2 is a diagram of a network to which a scheduling method is applied according to an embodiment of the present invention. As illustrated in FIG. 2, cluster heads are sequentially applied an ID in an order of the cluster heads having a largest number of links according to a number of linked nodes. In FIG. 1, an order of IDs of the cluster heads is 1→2→3→4→5.

Referring to FIG. 2, when a cluster head 2 of the cluster 2 collects the link information, a node 2 202 capable of detecting a node 1 201 of the cluster 1 sends to the cluster head 2 not only link information 301 related to a node 3 204 in a cluster 3 including the node 2 202 but also information about resource allocation 302 that is obtained from the node 1 201, and link information related to the node 1 201.

Before performing the BSA, it is necessary to previously obtain information so as not to allocate resources to a node in which collision may occur. According to the conventional art, in FIG. 2, a cluster head 1 has to transmit cluster information to a cluster head 2. However, in order to minimize complexity and power consumption, the scheduling method according to the present embodiment involves allowing an edge node 201 in a cluster 1 to provide an edge node 202 in a cluster 2 with information and a transmission schedule related to the cluster 1, wherein the a distance between the edge node 102 and the edge node 202 is equal to or less than 2 hops.

By transmitting the information to neighboring cluster heads, when the cluster head performs BSA scheduling to nodes in the corresponding cluster head, it is possible to avoid collision in consideration of a schedule of the nodes at a border between clusters.

Figure 3A:
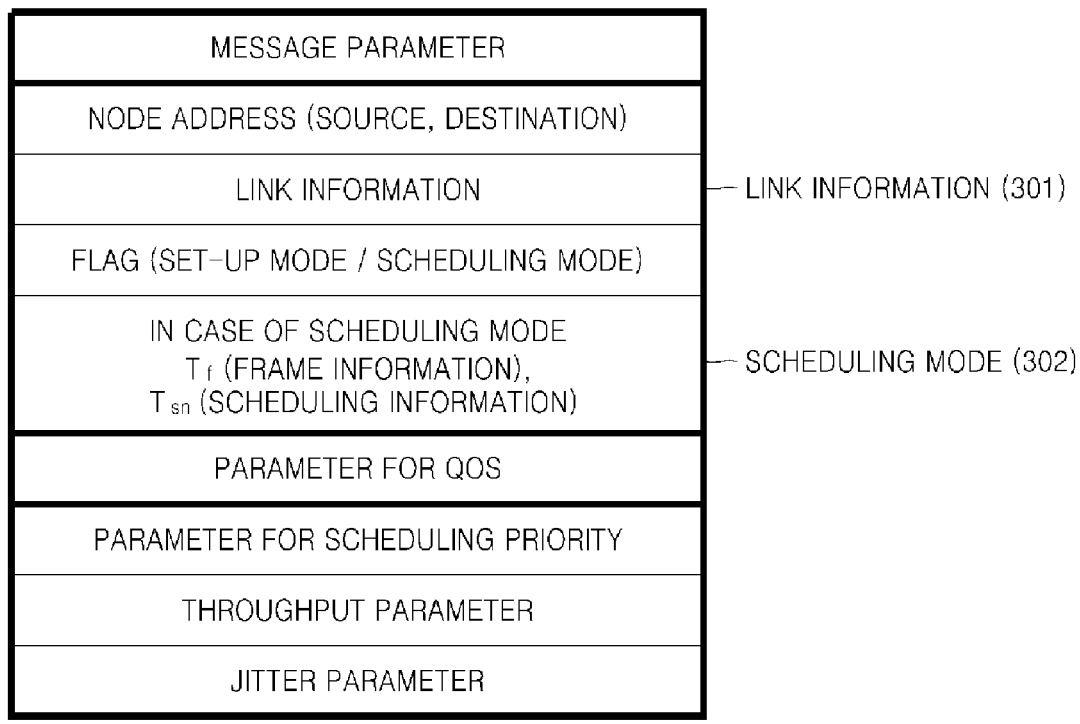
FIG. 3A is a diagram for describing definitions of link information and scheduling information.

An example of a message exchanged in this procedure is illustrated in FIG. 3A. The message is roughly divided into a message parameter field, and a service quality parameter field. The message parameter field may include a field for indicating addresses of a source node and a destination node, a field of the link information 301, a flag field for indicating whether a cluster is in a set-up mode or a scheduling mode that is for the resource allocation, and a scheduling field 302 for having loaded thereon frame information and scheduling information, if the cluster is in the scheduling mode. The service quality parameter field has loaded thereon parameters for Quality of Service (QoS), and may include a field having loaded thereon a parameter for scheduling priority between clusters, a throughput parameter field, and a jitter parameter field having loaded thereon jitter information. Obviously, other information may be added to the message of FIG. 3. After that, the cluster head 2 performs a centralized resource allocation algorithm, and thus, allocates a resource to the node 2 202 while avoiding collision with the node 1 201 included in the cluster 1.

Figure 3B:
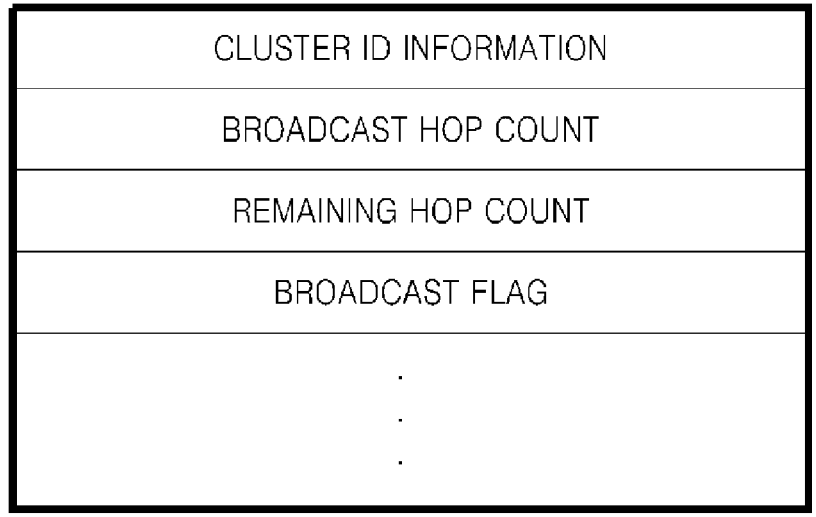
FIG. 3B is a diagram for describing definitions of cluster head(CH) message.
Figure 3C:
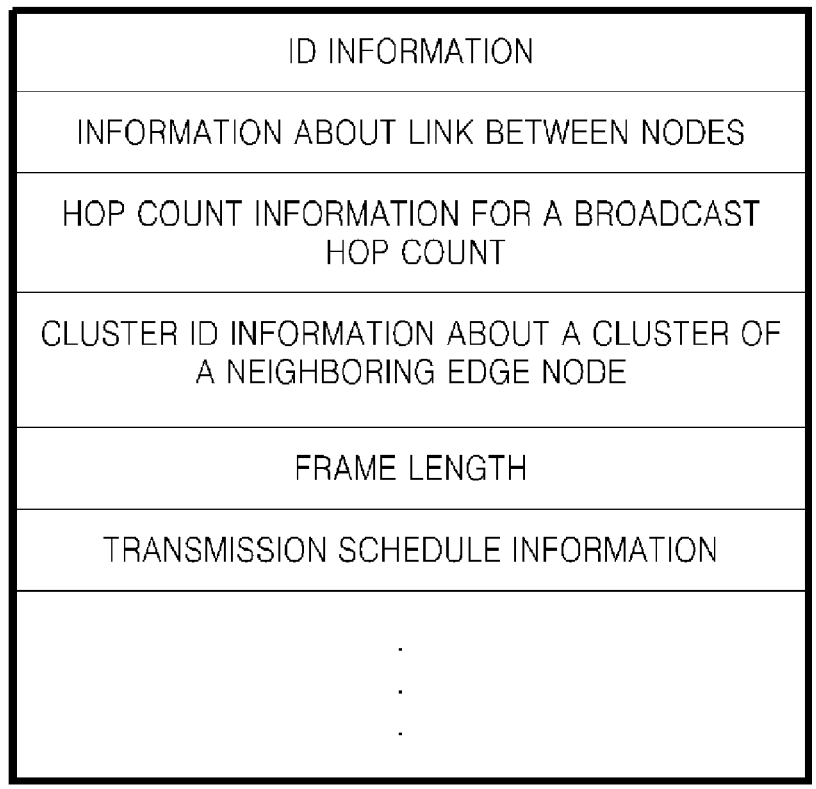
FIG. 3C is a diagram for describing definitions of edge node message.

As illustrated in FIG. 3B, A cluster head (CH) message includes cluster ID information, a broadcast hop count, a remaining hop count, and a broadcast flag of 0 or 1. Also, as illustrated in FIG. 3C, an edge node message includes ID information, information about a link between nodes, hop count information for a broadcast hop count, cluster ID information about a cluster of a neighboring edge node, a frame length, and transmission schedule information.

According to a current embodiment, in the case where the cluster head (CH) message is used in a cluster so as to transmit control information for a network operation or to inform a new schedule, the broadcast flag is set as 0. The cluster head (CH) message in which a value of the broadcast flag is set as 0 is delivered to all nodes in the cluster. In the case where the cluster head (CH) message is transmitted over an entire network, that is, in the case where the cluster head (CH) message is transmitted to other clusters, the broadcast flag is set as 1 and then is delivered to all nodes in the network.

In a network initial setting, when edge nodes transmit an edge node message to a cluster head, the edge node message is delivered having a hop count set as 1. Intermediate nodes forwarding/routing a message from an edge node to the cluster head sequentially increase a number of the hop counter in the edge node message.

Thus, when the cluster head receives the edge node message, the cluster head may know the edge node which has transmitted the edge node message and a hop count distance. At this time, the largest hop count number is set as a broadcast hop count number of the cluster. The broadcast hop count is used when the cluster head performs broadcasting and multicasting operations on all nodes in the cluster.

The broadcast hop count is used to determine adjustment of a frame size of the network, and a time of change with respect to a transmission schedule. In the case where the network is changed due to that a new node is added to the network, a node leaves the cluster, or a node is turned off, so that the hop count number of the edge node message from the edge nodes is changed, the cluster head updates the broadcast hop count of the cluster.

After that, in an initial schedule set-up, each cluster head uses a broadcast hop count used to cast a message in a corresponding cluster.

The cluster head uses the broadcast hop count and the remaining hop count so as to prevent a message to transmit from leaving a range of the cluster. At this time, the remaining hop count is calculated based on the broadcast hop count.

The broadcast hop count number and the remaining hop count number are included in the message from the cluster head. The broadcast hop count number of the cluster may be changed by the cluster head. The cluster head changes the broadcast hop count number when a hop count necessary for the broadcasting or multicasting operation in the cluster is changed. Although the remaining hop count number is the same as the broadcast hop count number that is initially set when the cluster head transmits the message, the remaining hop count number is sequentially reduced as a cluster message is delivered to a next node in a hop by hop manner in the cluster, and when the hop count number indicates 0, that node stops delivering the message.

The cluster head required to change a frame length determines an upper limit value of entire hops of the network to be a broadcasting hop count of a cluster head message, changes the cluster head message in synchronization, and transmits the cluster head message including a frame number. At this time, the cluster head sets a broadcast flag of the cluster head message to be 1, and transmits the cluster head message to nodes in the network. A cluster head message including the broadcast flag value set as 0 indicates a message that is set to be delivered only within clusters corresponding to a broadcast hop count number from a corresponding cluster.

All of the cluster head message, the node message, and the edge node message use a sequence number, and whenever a new message is transmitted, the sequence number is sequentially increased. In the case where a same message is received again, the nodes compare a node ID, a cluster ID, and the sequence number of a message, and as a result of the comparison, if it is determined that the same message is received again, the node determine actions based on a previously received message and ignore the same message that is received at a later time. Referring to FIG. 4, a node 5 403 sends link information and resource allocation information related to a node 4 401 of a neighboring cluster to a cluster head 3 of a cluster 3 including the node 5 403. If a node in the cluster 3 is located within a communication range by a 1-hop distance with a node in the cluster 2, link information and resource information related to the node in the cluster 2 are also sent to the cluster head 3 of the cluster 3. When all pieces of link information related to all nodes are collected, the cluster head 3 performs the centralized resource allocation algorithm for nodes included in the cluster 3. The aforementioned procedures are sequentially repeated until a last cluster head 5 ends resource allocation. After the resource allocation of all nodes in the whole network has ended, the clusters formed for the resource allocation are disbanded, and then communication is performed in the ad-hoc network.

After frame synchronization, with respect to a portion whose frame length is extended, each cluster may perform additional scheduling for improvement of a service quality for the nodes in each cluster, by using the BSA. After scheduling/resource allocation operations in the network are complete, if a change occurs in a cluster, only the cluster may perform scheduling again. Thus, as the network expands, a time taken to re-adjust transmission scheduling may be reduced, and an improved efficiency in view of complexity with respect to the number of messages to be transmitted may be obtained. Also, it is possible to considerably reduce power consumption.

If it is assumed that a frame of variable length is used, frame synchronization between the clusters may not be achieved according to the aforementioned resource allocation algorithm. In this regard, possible solutions to solve this problem are as follows:

1. In most centralized resource allocation algorithms assuming that a frame length is variable, the length of a final frame is dependent on the number of nodes in a cluster. Thus, when nodes are first deployed and grouped into clusters, cluster heads may communicate with other neighboring cluster heads, and thus, may divide the nodes in such a manner that the clusters may mutually have a similar number of nodes. For example, a network clustered in a manner shown in FIG. 1 may configure clusters in a manner shown in FIG. 4 and thus, may allow cluster heads to have a similar number of nodes respectively for the clusters. Referring to FIG. 5, when cluster heads 4 501 and 5 502 perform the centralized resource allocation algorithm, the cluster heads 4 501 and 5 502 may make the length of a frame relatively long to be equal to the length of a frame in neighboring clusters, and then may use remaining slots so as to ensure QoS.

2. When an order with respect to the performance of the centralized resource allocation algorithm is set in the network clustered in a manner shown in FIG. 1, the order is determined according to the size of clusters. In most centralized resource allocation algorithms assuming that the frame length is variable, the length of a final frame is dependent on the number of nodes in a cluster so that the length of a frame in the largest cluster is the longest, and other clusters fix the length of a frame according to the longest length of the frame and then perform resource allocation. In the case where remaining slots occur due to the large length of a frame, the remaining slots may be used for a QoS service at a later time.

The descriptions in the above, that is, the resource allocation method according to the present embodiment may be classified into a flowchart of an order of operations with respect to a network, and a flowchart of an order of operations with respect to each node, which are respectively illustrated in FIGS. 6 and 7. While referring to FIGS. 6 and 7, the resource allocation method according to the present embodiment will be summarized again.

First, referring to FIG. 6, a wireless sensor network formed of a plurality of nodes is divided into one or more clusters. As described above, the wireless sensor network may be divided in such a manner that the clusters may have a similar number of nodes in operation S610.

A scheduling order is determined for the clusters in operation S620. At this time, the scheduling order may be determined according to an order of IDs of cluster heads of the clusters, or the scheduling order may be set to give a priority to a larger cluster so that the larger cluster may perform resource allocation in advance. Before resource allocation is performed by each of the clusters, as described above with reference to FIGS. 2 through 5, each of the cluster heads collects link information about its corresponding cluster and link information about neighboring clusters from the nodes managed by each of the cluster heads in operation S630, and then a scheduling operation is performed in operation S640.

The cluster head of each cluster sequentially allocates resources to the nodes in each cluster according to a resource allocation order, and determines whether it is a last cluster in operation S650. If it is the last cluster, cluster is disbanded in operation S660, and then ad-hoc communication is performed in operation S670. Otherwise, if it is not the last cluster, operation S630 and operations thereafter are repeated.

Referring to FIG. 7, the aforementioned procedures are performed with respect to each node. As described above, after the wireless sensor network is divided into clusters, nodes of each cluster elect a cluster head for each cluster so that the clusters are finally set in operation S710. Each node of each cluster determines whether the node is an edge node in operation S720. If the node is not the edge node, the node collects link information related to other nodes in the cluster including the node, and thus delivers the link information to the cluster head in operation S740. Otherwise, if the node is the edge node, the node obtains link information and scheduling information (shown in FIG. 3) related to a cluster within a communication range from another edge node of the cluster within the communication range, and thus delivers the obtained information to the cluster head in operation S760.

Based on the collected information, each cluster head performs a scheduling operation in operation S750. When the scheduling operation has ended, cluster is disbanded in operation S760, and the whole network performs ad-hoc communication in operation S770.

As described above, when the clusters are formed and the cluster heads are elected, the number of nodes between the clusters may be similar or equal, and contents of information exchanged between the nodes may be the same as that illustrated in FIG. 3.

The resource allocation method according to the present embodiment may decentralize a load of calculations to several nodes, wherein the load may be centralized to one node in a large ad-hoc network, so that an energy efficiency of the node may be increased. Also, since the several nodes sequentially perform a simple calculation, a total of the resource allocation time may be reduced. In addition, cluster collision that may occur in the distributed resource allocation algorithm may be eliminated so that an energy efficiency and reliability of the whole network may be improved.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A resource allocation method performed in a wireless network formed of a plurality of nodes, the resource allocation method comprising:
   forming clusters and electing cluster heads respectively for the clusters;
   determining whether a node from among the plurality of nodes forming the wireless network is an edge node;
   if the node is not the edge node according to a result of the determining, collecting link information related to other nodes in a cluster that comprises the node and delivering the link information to a cluster head of the cluster; and
   if the node is the edge node according to a result of the determining, otherwise, obtaining link information and scheduling information from an edge node of another cluster within a communication range with the cluster comprising the edge node, and delivering the link information and scheduling information to the cluster head.

2. The resource allocation method of claim 1, wherein the forming of the clusters comprises dividing the clusters whereby the clusters of the wireless network mutually have a similar or equal number of nodes.

3. The resource allocation method of claim 1, wherein the link information comprises information indicating addresses of a source node and a destination node, and a set-up mode or a scheduling mode.

4. The resource allocation method of claim 1, wherein, if the node is in the scheduling mode, the scheduling information comprises frame information and scheduling information.

5. The resource allocation method of claim 1, wherein the link information and the scheduling information further comprise scheduling priority information, throughput information, and a jitter parameter.

6. The resource allocation method of claim 1, wherein the communication range indicates a 1-hop distance or a two-hop distance.

* * * * *